Patented July 22, 1952

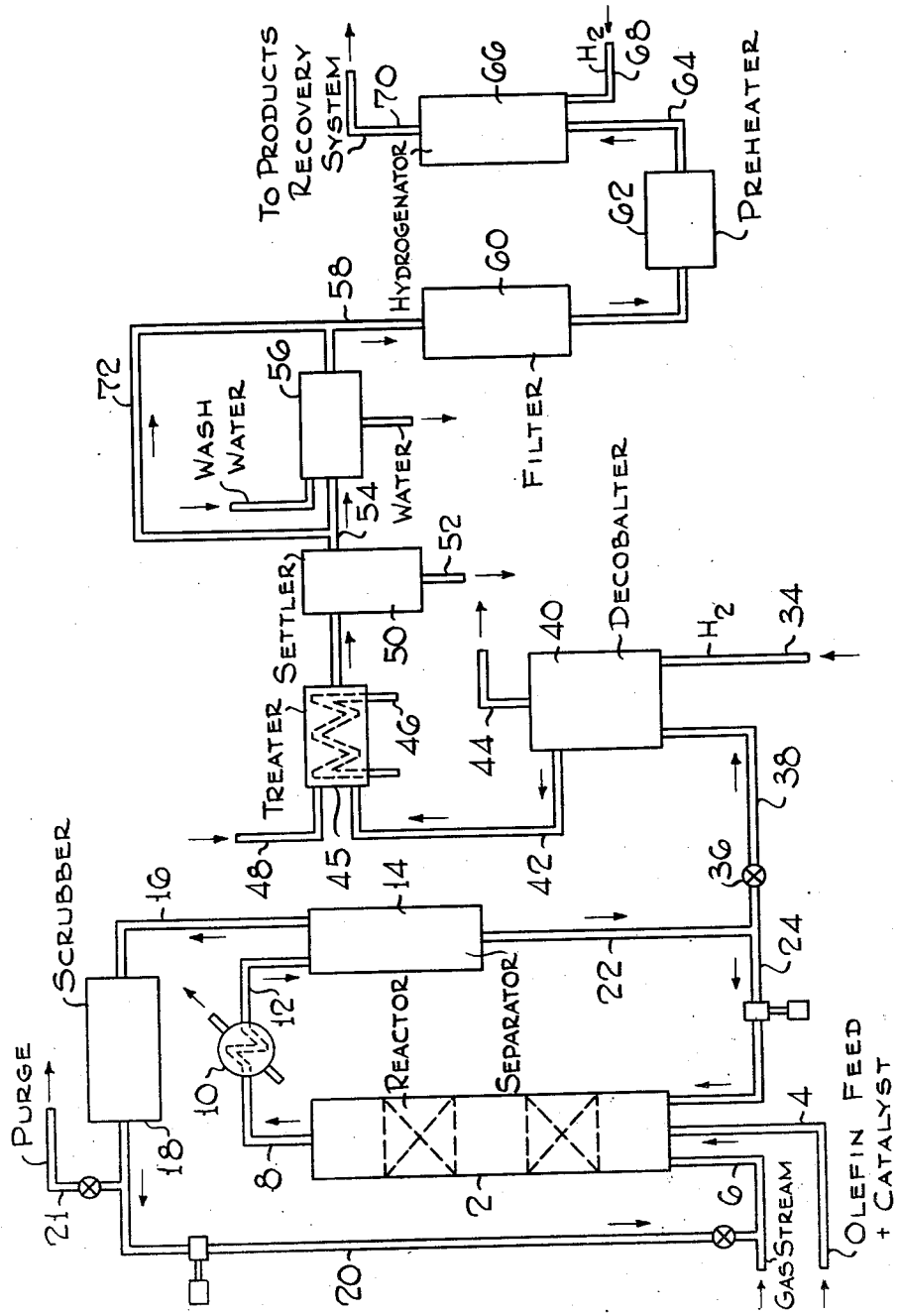

2,604,491

UNITED STATES PATENT OFFICE 2,604,491

IRON REMOVAL FROM ALDEHYDE SYNTHESIS PROCESS

Cecil H. Hale, Baton Rouge, La., assignor to Standard Oil Development Company, a corporation of Delaware Application April 1, 1949, Serial No. 84,878

14 Claims. (Cl. 260—598)

The present invention relates to the preparation of oxygenated organic compounds by the reaction of carbon monoxide and hydrogen with carbon compounds containing olefinic linkages in the presence of a carbonylation catalyst. More specifically, this invention relates to an improved process for removing catalytic material from the reaction products resulting from the interaction of olefinic compounds with carbon monoxide and hydrogen.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus straight and branch chained olefins and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the process is usually added in the form of salts of the catalytically active metal with high molecular fatty acids, such as stearic, oleic, palmitic, naphthenic, etc., acids. Thus suitable catalysts are, for example, cobalt oleate or naphthenate, or iron linoleate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture, and it is to this stage that the present invention applies.

One of the major problems involved in the aldehyde synthesis reaction is the fact that the catalyst metal and other carbonyl forming metals such as cobalt, iron, etc., though added as organic salts to the reaction zone, react with carbon monoxide under the synthesis conditions to form metal carbonyls. There is basis for the belief that the metal carbonyl or hydrocarbonyl is the active form of the catalyst. The carbonyl remaining dissolved in the reaction product from the primary carbonylation stage can then be removed in an intermediate catalyst removal stage and this is customarily done by heating the primary reaction product in a suitable chamber or tower with or without packing at atmospheric or superatmospheric pressures and usually in the presence of a slow stream of an inert stripping gas such as hydrogen in order to remove overhead the carbon monoxide resulting from the decomposition of the metal carbonyl to protect the nickel or cobalt or other carbonyl forming metal employed in the subsequent high pressure hydrogenation stage. Though this process is quite satisfactory as far as removing the cobalt carbonyl is concerned by decomposing the latter into metallic cobalt and carbon monoxide, and though the soluble cobalt in the primary reaction product may be substantially removed, small quantities of other metallic carbonyls, in particular iron carbonyl, are not completely removed by this process. Iron carbonyl arises from various sources such as from the interaction of carbon monoxide at high pressures with iron-containing impurities in the feed, reaction of carbon monoxide with the walls of the reactor and transfer lines, reactor packing, and the like. Iron carbonyl is considerably more stable than the cobalt analogue and thus while the latter is decomposed under decobalting conditions in the catalyst removal zone, or decobalter, iron carbonyl is only partially decomposed. Thus while the concentration of soluble cobalt leaving the catalyst removal zone after treatment described above, may be 0.005% or less, the concentration of soluble iron is often as much as 0.02% or more. It is highly undesirable for soluble iron to be present in the product leaving the catalyst removal zone because of the tendency for the soluble iron compounds to decompose under the more severe conditions obtaining in the hydrogenation zone and in the preceding heating coils, resulting in plugged lines and also in deactivation of the hydrogenation catalyst; accordingly, it is highly desirable to keep the concentration of carbonyls and other soluble metallic compounds and complexes, both iron and cobalt, less than 0.005% in the effluent from the catalyst removal zone.

As a result of the heat treatment of the primary reaction product containing in solution the metal carbonyls, CO is evolved as noted above and a precipitate of the metal is formed, the metal being in an extremely finely divided form, existing partly as a suspension, partly as a colloid, requiring for removal a lengthy and costly filtration because of the extremely fine state of subdivision of the particles.

It is one of the purposes of the present invention to provide improved means for removing iron and other carbonyl-forming metals from the carbonylation reaction product and to prevent plugging of reactor lines and deactivation of the hydrogenation catalyst.

Another purpose of the invention is to provide an efficient means for decomposing substantially completely metal compounds present in the carbonylation reaction effluent.

Another purpose of the present invention is to provide a means of removing finely divided and colloidably dispersed metal solids from suspension in the reaction product.

Other and further objects and advantages of the invention will become apparent from the description hereinafter.

It has now been found that these objects may readily be accomplished and a reaction product obtained substantially free of dissolved or suspended metal by treating the primary reaction product with an alkaline treating agent prior to hydrogenation. This treatment preferably follows the decobalting in the catalyst removal stage, though if desired it may be concurrent, or under certain circumstances even precede that step. Preferably, however, the product from which the bulk of the dissolved metal has been removed by heat treatment and stripping is treated in a reflux zone with an aqueous solution of caustic, $Na_2CO_3$, KOH, or the like and, as a result, a precipitate of iron and cobalt hydroxide settles out from the solution. Because of the gelatinous nature of the precipitate of iron hydroxide, the finely divided suspension and colloidally dispersed cobalt and iron metal is removed by occlusion from the solution, and the resultant mixture may be allowed to stand to allow for layer separation, and the upper layer may then be sent to the hydrogenation stage without filtration, or only a rapid passage through a filter medium such as sand.

The present invention and its application will best be understood from the more detailed description hereinafter, wherein reference will be made to the accompanying drawing, which is a schematic representation of a system suitable for carrying out a preferred embodiment of the invention. Referring now to the figure, as olefinic compound having one carbon atom less than the number of carbon atoms in the desired resulting oxygenated compound is fed through feed line 4 to the bottom portion of primary reactor 2. The latter comprises a reaction vessel which may, if desired, be packed with non-catalytic material, such as Raschig rings, porcelain chips, pumice, and the like. Reactor 2 may be divided into discrete packed zones, or it may comprise but a single packed zone, or even if desired, may contain no packing.

The olefinic feed preferably contains dissolved therein 1–3% by weight of cobalt naphthenate based on the olefin. Other compounds of cobalt or of iron, or their mixtures, may also be used. Simultaneously, a gas mixture comprising $H_2$ and CO in the approximate ratio of 0.5 to 2 volumes of $H_2$ per volume of CO is supplied through line 6 to primary reactor 2 and flows concurrently through reactor 2 with said olefin feed. Reactor 2 is preferably operated at a pressure of about 2500–3500 p. s. i. g. and at a temperature of about 250°–450° F., depending upon the olefin feed and other reaction conditions. The rate of flow of synthesis gases and olefin through reactor 2 is so regulated that the desired conversion level of the olefin is obtained.

Liquid oxygenated reaction products containing catalyst in solution and unreacted synthesis gases are withdrawn overhead from an upper portion of high pressure reactor 2 and are transferred through line 8 to cooler 10 in which any conventional means of cooling are employed, and from there via line 12 to high pressure separator 14 where unreacted gases are withdrawn overhead through line 16, scrubbed in scrubber 18 of entrained liquid and cobalt carbonyl and used in any way desired. They may be recycled to synthesis gas feed line 6 via line 20 or purged via line 21.

A stream of primary reaction product containing dissolved therein relatively high concentrations of cobalt carbonyl and some iron carbonyl is withdrawn from separator 14 through line 22. A portion of said withdrawn stream may be recycled if desired, to reactor 2 via line 24 to aid in the cooling and maintenance of temperature control of the primary carbonylation stage. The balance of the primary reaction product, which may comprise unreacted olefin, secondary reaction products, and dissolved catalyst and metal carbonyls as well as desired aldehydes, is withdrawn through pressure release valve 36 and line 38 and passed to catalyst removal or decobalting zone 40. Within decobalter 40 the soluble cobalt carbonyl and a portion of iron carbonyl formed from sources enumerated above is removed from the aldehyde produced prior to high pressure hydrogenation in order to prevent its decomposition in the hydrogenation stage with consequent reactor plugging and hydrogenation catalyst contamination and inactivation with metallic cobalt or iron. Carbonyl decomposition is obtained by heating the aldehyde product by such means as closed steam coils (not shown) to 300°–350° F. at a pressure just high enough to keep the components in the liquid phase. Pressures in the neighborhood of 100–150 p. s. i. g. are preferably though higher or lower may be employed. The product containing catalyst in solution is injected into zone 40 through line 38 at a feed rate of about 2–4 v./v./hr. If desired, stripping gas, such as hydrogen, may be added through line 34 to aid in decreasing the CO partial pressure. If desired, it may be advantageous to operate with two or more decobalters, switching the stream from one to another as the one in service accumulates excessive quantities of mixed cobalt and iron metal. The gas stream comprising stripping gas and CO may be removed overhead from 40 through line 44 and used as desired.

The liquid aldehyde product now substantially free of dissolved cobalt carbonyl, but containing in solution iron carbonyl, some iron soaps and complexes, and possibly some cobalt compounds, and in suspension and dispersion, finely divided iron and cobalt metal, is withdrawn from catalyst removal zone 40 through line 42 and passed to treating zone 45. This latter may be a vessel equipped with closed or open steam coils 46 and preferably with means of agitation and reflux (not shown). An aqueous solution of NaOH, preferably about 10%, though it may vary from 5 to 50%, is admitted through line 48 at the rate of about 1–10 volumes reagent per 100 volumes product, maintaining agitation and, if desired, under reflux conditions. The mixture of product, precipitated iron hydroxide, and water is then passed to settling zone 50. The lower layer, consisting of spent caustic and suspended iron hydroxide and occluded finely divided metal, may be withdrawn through line 52 and discarded. The upper layer, now substantially free of dissolved and suspended iron and cobalt, may be passed through line 54 to washing zone 56, wherein it is thoroughly agitated with water to remove any alkaline treating agent, the upper product layer then withdrawn through line 58 and passed to filter 60 if desired, for a simple filtration, though this may be omitted if desired.

The filtered solution is withdrawn from filter 60, passed through preheater 62 to the bottom portion of hydrogenation reactor 66 via line 64. Simultaneously hydrogen is supplied to hydrogenation reactor 66 through line 68 in proportions sufficient to convert aldehydes into the corresponding alcohols. Reactor 66 may contain a mass of any conventional hydrogenation catalyst, such as nickel, copper chromite, sulfactive catalyst such as tungsten, nickel or molybdenum sulfides preferably supported on carriers such as charcoal, pumice, and the like. Reactor 66 is preferably operated at a temperature of about 400°–500° F., pressure of about 2500–3500 p. s. i. g., and liquid feed rate of about 0.5–0.8 v./v./hr.

The products from the hydrogenation reactor and unreacted hydrogen may be withdrawn overhead through line 70 and passed to the products recovery system and alcohols recovered all in a manner known per se.

The invention admits of numerous modifications apparent to those skilled in the art. Thus mention has not been made of various accessory equipment which normally are used in a commercial plant. Thus in the interest of good heat economy, various heat exchangers and economizers would be employed to utilize whatever heat is available in the most effective and efficient manner and, in order to control the process, pumps, compressors, valves, flow meters, etc. would be included in the equipment. Also, instead of treating the primary reaction product with aqueous alkaline solutions at room or reflux temperatures, the decobalted product may be contacted with the solid alkaline materials, such as NaOH or KOH, at elevated temperatures. Excellent results have been obtained when decobalted aldehydes still containing significant quantities of iron were treated with solid KOH at the boiling point of the mixture. Furthermore, instead of an alkali hydroxide, a strong organic base, such as tri or tetramethyl ammonium hydroxide may be employed as a primary reaction product treating medium to precipitate iron hydroxide. The advantage in the use of this type of compound is that its decomposition products are gaseous and need not be removed from the product layer by washing in order to prevent later danger of contamination of hydrogenation catalyst. Thus in the subsequent heating coils, tetramethyl ammonium hydroxide is decomposed to trimethyl amine and methyl alcohol, neither of which is a solid nor a contaminant, thus avoiding possible reactor inlet line and coil plugging or catalyst contamination. Thus this reagent as an aqueous solution may be passed into contacting zone 45 through line 48 and after thorough mixing, the mixture of reagent, aldehyde product and precipitated metal hydroxides passed to settling zone 50. The lower layer from 50 may be withdrawn, filtered, fortified with further reagent, and recycled to treater 45. The washing stage, however, is advantageously omitted, and the upper layer from settler 50 may be passed directly to filter 60 via by-pass line 72.

The invention may be further illustrated by the following examples which help point up the advantages of the process hereinbefore described.

*Example I*

Primary reaction product from a semi-commercial plant comprising principally octyl aldehyde prepared from a $C_7$ olefin cut, and which has been passed through a catalyst removal zone and subjected to catalyst removal conditions, i. e., heating for a period of about 1 hour with a closed steam coil in the presence of $H_2$ at a temperature of about 305° F. and wherein, as a result of such treatment, and subsequent filtration through a sand filter bed the soluble cobalt concentration was reduced to about .003% and the iron concentration to about 0.011% was refluxed for about ¼ hour at 150° F. with 10% NaOH solution. The resulting upper layer after separation was found to contain no iron.

*Example II*

Primary reaction product obtained as above, but before filtration, was agitated at room temperature with 10% NaOH for 5 minutes. As a result, the amount of iron in solution was decreased from 0.039% before treatment, to 0.002% after such treatment.

*Example III*

Another sample of the same material as above was treated for 5 minutes with solid KOH at a temperature of about 150° F. The resulting iron concentration of the aldehyde product was only 0.001%.

*Example IV*

Another sample of decobalted product subsequently filtered, having a cobalt content of less than .005% but an iron content of 0.01% was refluxed with 10% by volume of a 1 molar aqueous solution of tetramethyl ammonium hydroxide. The resulting aldehyde product had an iron concentration of only 0.003%.

*Example V*

A sample of the octyl aldehyde product from the primary reactor was treated prior to passage through the catalyst removal zone with a 10% solution of 1 molar $(CH_3)_4NOH$ under reflux conditions. The soluble iron concentration was reduced from 0.07% to 0.008%.

The foregoing description and examples though illustrating specific applications and results of the invention, are not intended to exclude modifications obvious to those skilled in the art and which are within the scope of the invention.

What is claimed is:

1. In a carbonylation process wherein carbon compounds containing olefinic double bonds are contacted in an initial reaction zone with carbon monoxide and hydrogen in the presence of a cobalt carbonylation catalyst under conditions to produce reaction products comprising oxygenated organic compounds containing at least one more carbon atom than said olefinic compounds, and wherein cobalt and iron carbonyls are dissolved in said reaction products, and the solution comprising said reaction products and dissolved carbonyls is transferred to a catalyst removal zone wherein the bulk of the carbonyls are decomposed under the influence of temperatures and pressures conducive to the decomposition of cobalt carbonyl in said catalyst removal zone, and wherein a liquid effluent comprising said oxygenated products as well as undecomposed iron carbonyl and dispersed finely divided cobalt is withdrawn from said last-named zone and passed to a hydrogenation zone, the step of removing dissolved iron compounds and dispersed solid from said effluent which comprises contacting the latter with a highly ionized alkaline treating agent in a treating zone the temperatures ranging from room temperature to the boiling point of said effluent whereby iron hydroxides are precipitated, and recovering from said treating zone a liquid product comprising oxygenated organic compounds substantially free of dissolved and dispersed cobalt and iron contaminants.

2. The process of claim 1 in which said treating agent is an alkaline reacting compound of an alkali metal.

3. The process of claim 2 wherein said compound is added to said treating zone as an aqueous solution.

4. The process of claim 2 wherein said compound is added to said treating zone in solid form.

5. The process of claim 1 wherein said treating agent is an organic derivative of ammonia.

6. The process of claim 5 wherein said treating agent is a tetra-alkyl ammonium hydroxide.

7. The process of removing undecomposed dissolved iron carbonyl and dispersed iron and cobalt metal from the liquid effluent from the catalyst removal zone of a carbonylation reaction process wherein olefinic compounds are reacted with CO and $H_2$ in the presence of a cobalt carbonylation catalyst which comprises passing said effluent into a treating zone, passing an aqueous solution of an alkali metal hydroxide into said zone, maintaining a temperature in said treating zone of from about 50°–300° F., precipitating metal hydroxides from said effluent, passing the mixture to a settling zone, withdrawing a lower aqueous layer from said zone, passing an upper organic layer to a washing zone, and recovering an organic product substantially free of dissolved contaminants.

8. The process of claim 7 wherein said aqueous solution may have a concentration of 5–50% by weight of alkali metal hydroxide.

9. The process of claim 7 wherein said effluent after washing is passed through a filtration zone prior to passing to a hydrogenation zone.

10. The process of claim 7 wherein said olefin is a heptane fraction.

11. The process of removing undecomposed dissolved iron carbonyl and dispersed iron and cobalt metal from the liquid effluent from the catalyst removal zone of a carbonylation reaction process wherein olefins are reacted with CO and $H_2$ in the presence of a cobalt carbonylation catalyst which comprises passing said effluent into a treating zone, passing an aqueous solution of tetramethyl ammonium hydroxide into said zone, precipitating metal hydroxides and occluding dispersed metals from solution, passing the mixture to a settling zone, and recovering a primary carbonylation reaction product substantially free of dissolved and dispersed iron and cobalt.

12. The process of claim 11 wherein the concentration of said aqueous solution is about 1 molar.

13. The process of claim 1 wherein said treating agent is an alkali metal hydroxide.

14. The process of claim 1 wherein said treating agent is an alkali metal carbonate.

CECIL H. HALE.

REFERENCES CITED

The following references are of record in the file of this patent:

UNITED STATES PATENTS

| Number | Name | Date |
|---|---|---|
| 2,508,743 | Bruner | May 23, 1950 |
| 2,509,878 | Owen | May 30, 1950 |

OTHER REFERENCES

Mellor, "Comprehensive Treatise on Inorganic and Theoretical Chemistry," 1924, vol. 5, pages 953–959, Longmans, Green and Co.

Fiat Final Report No. 1000 PB–81383 Dec. 26, 1947, pages 11 to 17.

Fiat Final Report No. 1000 PB–81383, Dec. 26, 1947, page 28.

Freundlich et al., Berichte, vol. 56B (1923), pages 2264–2267.